United States Patent
Feist et al.

(10) Patent No.: US 6,724,471 B2
(45) Date of Patent: Apr. 20, 2004

(54) ARRANGEMENT FOR THE VERTICAL ORIENTATION OF A GEODETIC INSTRUMENT

(75) Inventors: Wieland Feist, Jena (DE); Wolfgang Hahn, Buergel (DE); Lawrence Smith, Dayton, OH (US)

(73) Assignee: ZSP Geodaetische Systeme GmbH, Jena (DE)

( * ) Notice: Subject to any disclaimer, the term of this patent is extended or adjusted under 35 U.S.C. 154(b) by 183 days.

(21) Appl. No.: 09/947,999

(22) Filed: Sep. 6, 2001

(65) Prior Publication Data

US 2002/0036768 A1 Mar. 28, 2002

(30) Foreign Application Priority Data

Sep. 7, 2000 (DE) .......................... 100 45 807

(51) Int. Cl.[7] .............................. G01C 1/10; G01C 5/00; G01C 15/00
(52) U.S. Cl. ...................... 356/148; 356/149; 356/250; 356/247; 33/290; 33/227; 33/277; 359/399
(58) Field of Search ................................ 356/247, 248, 356/148, 149, 250, 253, 138, 620, 4.01, 4.08, 139.1; 33/290, 227, 277; 359/399, 363, 429

(56) References Cited

U.S. PATENT DOCUMENTS

| | | | | |
|---|---|---|---|---|
| 5,159,760 A | * | 11/1992 | Spiegel et al. | 33/227 |
| 5,491,555 A | * | 2/1996 | Romine | 359/399 |
| 5,949,548 A | * | 9/1999 | Shirai et al. | 356/375 |
| RE37,318 E | * | 8/2001 | Porter | 33/290 |
| 6,324,024 B1 | * | 11/2001 | Shirai et al. | 359/884 |
| 6,487,011 B2 | * | 11/2002 | Donath et al. | 359/399 |

FOREIGN PATENT DOCUMENTS

| | | |
|---|---|---|
| DE | 40 07 245 | 9/1991 |
| DE | 296 03 681 U | 2/1996 |
| DE | 197 16 304 | 4/1997 |

* cited by examiner

Primary Examiner—Frank G. Font
Assistant Examiner—Layla Lauchman
(74) Attorney, Agent, or Firm—Reed Smith LLP

(57) ABSTRACT

An arrangement for the vertical orientation of a geodetic instrument over a ground point, comprises an optical observation device for visual sighting of the ground point with a target beam, a laser device for generating a laser beam, and an optical in-coupling element by which the laser beam and the target beam can be coupled into a target axis impinging vertically on the target point. In this way, an exact orientation of the geodetic instrument can be achieved under all light conditions. The geodetic instrument retains its compact dimensions. In addition, a laser in a lower hazard class can be used.

10 Claims, 2 Drawing Sheets

ARRANGEMENT FOR THE VERTICAL ORIENTATION OF A GEODETIC INSTRUMENT

CROSS-REFERENCE TO RELATED APPLICATION

This application claims priority of application Serial No. 100 45 807.6, filed Sep. 7, 2000, the complete disclosure of which is hereby incorporated by reference.

BACKGROUND OF THE INVENTION a) Field of the Invention

The invention is directed to an arrangement for the vertical orientation of a geodetic instrument over a ground point.

b) Description of the Related Art

For surveying purposes, it is necessary that geodetic instruments, e.g., tachymeters or theodolites, are centered as accurately as possible over a ground point which can be, in particular, a geodetic fixed point. Likewise, the accessories, including reflectors or sighting targets, must also be aligned over a ground point, and a vertical orientation of the vertical axis to the plane in which the ground point is located is required for the most accurate possible surveying.

Optical plummets are frequently used to assist in vertical orientation relative to a ground point. These optical plummets generally comprise an observation device, for example, in the form of a small telescope, by which the ground point is sighted. The optical axis of the observation device is orientated in a definite manner relative to the vertical axis of the geodetic instrument or is identical to it.

Moreover, an optical mark is often coupled into the observation beam and, depending on the operating mode, must be oriented to the ground point or must characterize this ground point. In the former case, the position of the geodetic instrument over the ground point is changed until the desired correspondence is achieved. In the latter case, the ground point is determined from the position of the geodetic instrument. Based on the defined position of the target beam in relation to the geodetic instrument, the latter is located in an exactly definable position with respect to the ground point.

Optical plummets of the type mentioned above are usually built directly into the geodetic instrument. In the case of tachymeters or theodolites which are inserted in a tribrach, it is also possible for the tribrach or its mechanism for receiving the tachymeter to be connected, or the theodolite, to be centered over the ground point initially by means of separate plumb bobs, after which the plumb bob device is removed and replaced by the tachymeter or theodolite.

Under unfavorable viewing conditions, it is occasionally difficult for an instrument of the type mentioned above to be oriented accurately with respect to the ground point by means of an optical plummet. For this reason, laser plummets, as they are called, have already been suggested. By means of these laser plummets, the geodetic instrument can be oriented vertical to the target plane in which the ground point is located by using a laser beam. For this purpose, the incident light spot of the laser beam is brought into coincidence with the ground point. A sufficiently exact orientation of the geodetic instrument with respect to the ground point is achieved based on the laser beam extending in a defined manner relative to the instrument.

However, laser plummets of this kind have the problem that the laser spot which is projected in the target plane is not clearly detectable, or not sufficiently so, in very bright surroundings, e.g., in harsh daylight, because it is swamped out. It would be possible to improve the brightness of the laser spot through the use of a more powerful laser emitter and so increase perceptibility in case of great surrounding brightness; however, the use of higher-power lasers carries an increased potential for injury to the user of the geodetic instruments, in which case additional design steps would be required to prevent personal injuries caused by incorrect use.

OBJECT AND SUMMARY OF THE INVENTION

Based on the above, it is the primary object of the invention to provide an arrangement of the type mentioned in the beginning which allows an accurate orientation of the geodetic instrument over the ground point under all visual conditions.

This object is met by an arrangement comprising an optical observation device for visual sighting of the ground point with a target beam extending in a spatially defined position in relation to the geodetic instrument, a laser device for generating a laser beam extending in a spatially defined position in relation to the instrument, and an optical in-coupling element by which the laser beam and the target beam can be coupled into a common optical target axis oriented vertically over the ground point.

An exact orientation of the geodetic instrument can be realized in a simple manner by the arrangement according to the invention even under unfavorable light conditions and viewing conditions. Thus, under poor viewing conditions, the orientation of the instrument is carried out by means of the laser beam which is coupled into the target axis. In extremely bright surroundings, on the other hand, orientation can be carried out by means of the optical observation device by coupling the target beam into the target axis without requiring a higher-power laser in this case.

Through the use of a common in-coupling element, the arrangement according to the invention can be realized at a lower cost in technology.

In an advantageous construction of the invention, the position of the optical in-coupling element within the geodetic instrument can be switched between two positions. In a first position, only the target beam is coupled into the target axis, whereas in the second position only the laser beam is coupled into the target axis.

The orientation of the geodetic instrument is accordingly carried out either by means of the optical observation device or, after the in-coupling element has been switched from one position to the other position, by means of the laser spot generated by the laser device in the target plane in which the ground point is located. In order to handle this switching in a particularly simple manner, the switching on and switching off of the laser device can be directly linked to the switching of the optical in-coupling element.

The in-coupling element is preferably a prism which has a first reflection surface for coupling the target beam into the target axis and a second reflection surface for coupling the laser beam into the target axis. To switch between the first position and the second position, the prism is arranged so as to be movable relative to the geodetic instrument. Through the use of a movable prism, a highly accurate orientation of the target beam, laser beam and target axis relative to the geodetic instrument can be achieved on the one hand and, on the other hand, handling remains simple when actuating the selectable plummets.

In another advantageous construction, the observation device and the laser device are arranged in a common sleeve with the prism disposed therebetween. The sleeve is movable axially along its longitudinal axis relative to the geodetic instrument for switching purposes. Further, it is ensured that an orientation of the sleeve relative to the geodetic instrument is guaranteed in two defined end positions of the adjustment path of the sleeve. These two end positions of the sleeve are linked with the two switching positions of the optical in-coupling element, i.e., the prism, for example, so that it is possible to choose between the laser plummet operating mode and the optical plummet operating mode by means of the axial movement of the sleeve. By arranging all of the structural components required for the orientation process in a common sleeve, this sleeve can be preassembled as a module and used in different geodetic instruments in many different ways. Moreover, the modular construction enables a particularly accurate orientation of the target beam and laser beam in relation to the target axis. Centering with respect to the geodetic instrument is then carried out by way of the bearing support of the sleeve.

In a constructional variant which is particularly advantageous in terms of design, the target beam and the laser beam are oriented in the direction of the longitudinal axis of the sleeve, whereas the target axis takes on a right angle to the longitudinal axis of the sleeve.

Further, it is possible to construct the in-coupling element as a swivelable mirror which couples the target beam or the laser beam into the target axis at a first adjustment angle and directs the other respective beam into the target axis at a second adjustment angle. The mirror can be constructed as a rotating mirror or as a folding mirror. In the latter case, the mirror deflects either the target beam or the laser beam at a first adjustment angle, while the other respective beam is interrupted. The interrupted beam is then coupled into the target axis at a second adjustment angle without deflection, while the other beam is blocked.

In another embodiment form, the in-coupling element is constructed as a stationary optical deflecting device which is oriented in a defined manner with respect to the geodetic instrument and has an optically selective coating. In a first variant, the optically selective coating transmits daylight in the visible range which impinges at a predetermined angle, whereas it reflects laser light impinging at a deviating angle. Conversely, in a second constructional variant, the optically selective coating reflects light in the visible range which impinges at an oblique incident angle, whereas it transmits laser light impinging at the same oblique incident angle.

Accordingly, it is not necessary to change the position of the in-coupling element; rather, the latter is fixedly positioned so that mechanical wear is prevented and a permanently high accuracy of the orientation of the beam paths relative to the geodetic instrument is ensured. Switching between the visual optical plummet operating mode and the laser plummet operating mode is then carried out only by means of switching the laser device on and off. Further, the laser spot which is projected in the target plane can also be visually observed in this embodiment form by means of the optical observation device.

When the orientation of the geodetic instrument is carried out using the laser device, the laser beam which is coupled into the target axis or the projected light spot serves as a mark which is to be brought to coincidence with the ground point. In this case, a special orientation mark, for example, a reticle or crosshair, can be dispensed with, so that the construction of the instrument can be simplified in a corresponding manner.

Since the target axis is vertically oriented, the target beam should be oriented orthogonal to the target axis in another construction which is advantageous with respect to ergonomics; this substantially facilitates visual sighting of the ground point.

On the other hand, the laser beam can also be vertically oriented like the target axis starting from the laser source and can accordingly be coupled directly into the target axis without the need for a change of direction. However, it is also possible to couple the laser beam as well as the target beam into the target axis at the optical in-coupling element proceeding from an orthogonal direction.

The laser source can be arranged on the same side of the geodetic instrument on which the component groups of the optical observation device are also located. The laser source can be arranged below or above these component groups, allowing the designer to find an optimal instrument construction.

It is also possible that the laser beam which is orthogonal to the target axis encloses an angle not equal to 0° with the target beam which is also orthogonal to the target axis considered in the direction of the target axis.

The invention will be described more fully in the following with reference to three embodiment examples shown in the drawing

DESCRIPTION OF THE PREFERRED EMBODIMENTS

Figure 1:
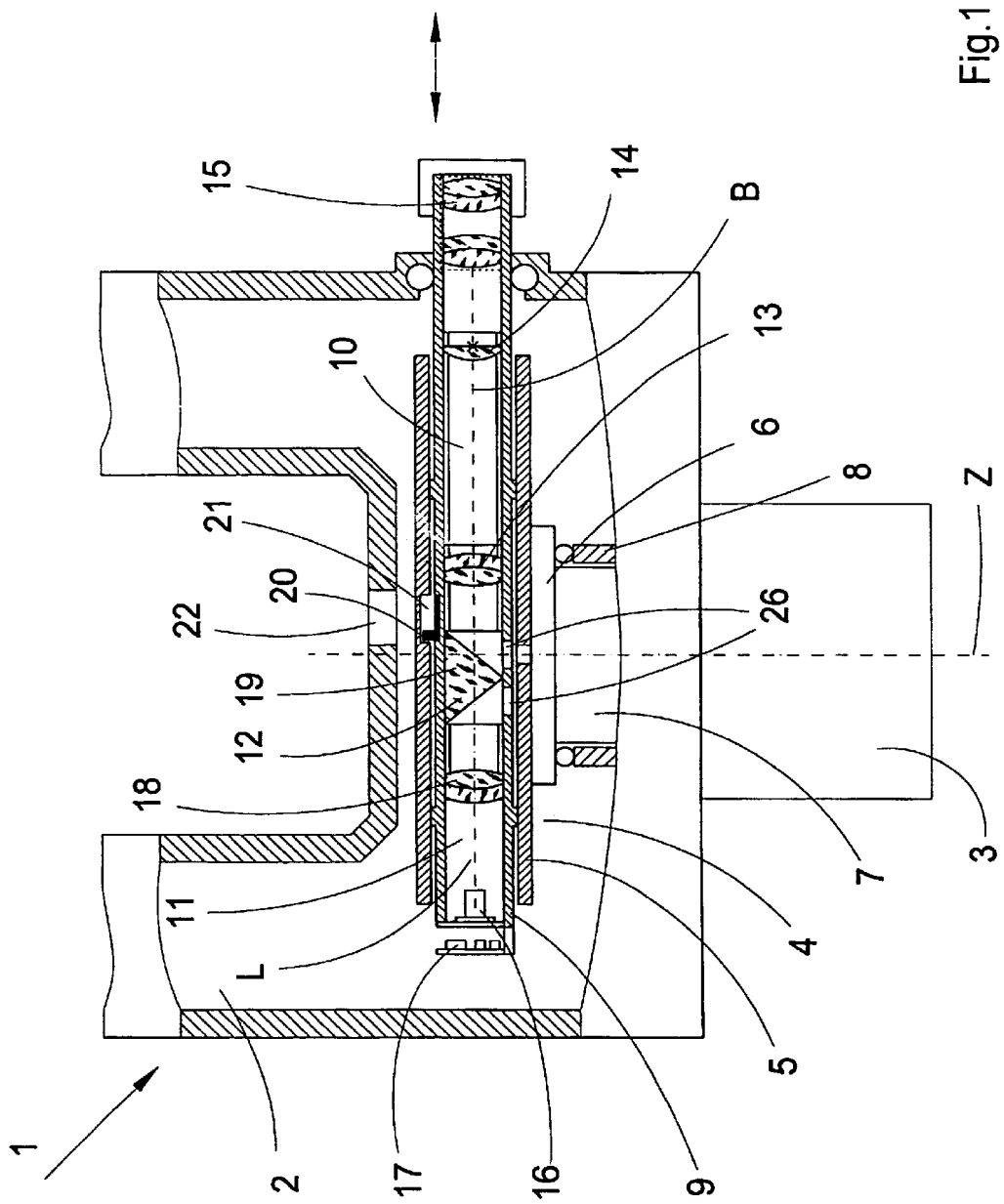
FIG. 1 shows a first embodiment example of an arrangement for the vertical orientation of a geodetic instrument with respect to a ground point in a partial sectional view.

The first embodiment example in FIG. 1 shows a geodetic instrument in the form of a tachymeter 1, wherein only a lower portion of a support 2 of the tachymeter 1 is shown in greater detail. The tachymeter 1 can be inserted in a base, for example, a tribrach or stand, via an insert pin 3 provided at the underside of the support 2. In this respect, the insert pin 3 takes on a centering function.

An arrangement for the vertical orientation of the tachymeter 1 with respect to ground inside the support 2 and comprises an optical plummet as well as a laser plummet. This arrangement forms a self-contained module 4 which is inserted in the support 2 and is oriented exactly with respect to the latter, so that an optical target axis Z which is to be oriented to the ground point allows a centering of the tachymeter 1 in a vertical line over the ground point.

The module 4 is fastened via a bearing sleeve 5 to an axial plate 6 which is mounted in turn by a pivot 7 in a bushing 8 provided at the support 2 so as to be rotatable about the target axis Z and is supported axially in direction of the target axis Z.

Another sleeve 9 whose longitudinal axis extends orthogonal to the target axis Z is arranged in the bearing sleeve 5 of the module 4. The sleeve 9 is guided inside the bearing sleeve 5 so as to be movable in a sliding manner along its longitudinal axis. It serves as a holder for an optical observation device 10 and a laser device 11 which are arranged coaxial to one another in this case and are separated by an optical in-coupling element 12 located in the sleeve 9.

This optical in-coupling element 12 is exactly oriented with respect to the other function elements of the tachymeter 1 via the sleeve 9 and couples the target beam B of the optical observation device 10 and the laser beam L of the laser device 11 into the target axis Z which is to be oriented vertically over the ground point.

The optical observation device 10 comprises an optical telescope which is arranged in the sleeve 9 and which includes an observation objective 13, a field lens 14 with an orientation mark in the form of a crosshair, and an eyepiece 15. Instead of the crosshair, other geometric patterns such as grids or reticle scales can also be used as orientation marks which can be perceived visually when looking through the eyepiece 15.

For purposes of orienting the tachymeter 1 over the ground point, this tachymeter 1 is displaced together with its tribrach until the ground point is located in a desired position relative to the orientation mark. With differently constructed geodetic instruments, it is also possible in an opposite sense to mark a desired ground point in the terrain; however, the position of the geodetic instrument must be exactly determined with reference to additional points in the surroundings.

The laser device 11 which is arranged coaxial to the optical observation device 10 comprises a laser diode 16 which is positioned on the longitudinal axis of the sleeve 9 and which, in order to supply with operating voltage, is connected to a printed circuit board 17 of the laser diode 16 arranged at the end of the sleeve 9. The laser device 11 further comprises a projection objective 18 for the laser beam L.

The laser beam L and the target beam B impinge on the optical in-coupling element 12 which is constructed in this case in the form of a back-sighted prism 19. This prism 19 has two reflection surfaces each of which is inclined at an angle of 45° to the target axis Z. A first reflection surface faces toward the optical observation device 10 and the second, oppositely located reflection surface faces toward the laser device 11, these two reflection surfaces together enclosing an angle of 90°.

The reflection surfaces deflect the target beam B and the laser beam L in beam paths parallel to the target axis Z. In a first end position, the target beam B can be coupled into the target axis Z by means of a displacement of the sleeve 9 in the direction of its longitudinal axis. This state is shown in FIG. 1.

On the other hand, the laser beam L can be coupled into the target axis Z in the second end position which is achieved when the sleeve 9 is displaced to the right as is shown in FIG. 1. For this purpose, the sleeve 9 and bearing sleeve 5 have suitable light passage openings 26.

This makes it possible to switch between an optical plummet operating mode and a laser plummet operating mode by displacing the sleeve axially. The sleeve 9 need only be pulled into the desired position for this purpose. Further, it is possible for the switching on and switching off of the laser device 11 to be coupled with the position of the sleeve 9 in the bearing sleeve 5 so that the operating voltage is applied to the laser diode 16 only when the prism 19 is located in a position for coupling the laser beam L into the target axis Z.

Suitable axial stops are provided between the sleeve 9 and the bearing sleeve 5 to facilitate control of the two above-mentioned positions of the prism 19, so that the two switching positions can be adjusted simply and surely by manual displacement of the sleeve 9.

In the present embodiment example, a stop pin 20 is provided for this purpose at the outer side of the sleeve 9 and is guided in a longitudinal groove 21 formed at the bearing sleeve 5. When the width or diameter of the stop pin 20 and the width of the longitudinal groove 21 are adapted to one another in a corresponding manner, the stop pin 20 can simultaneously serve to protect against rotation of the sleeve 9 relative to the bearing sleeve 5. An access opening 22 which is covered by a lock, not shown, during normal operation of the tachymeter 1 is provided in the support 2 in the region of the displacement path of the stop pin 20 for readjusting the axial position of the stop pin 20.

Figure 2:
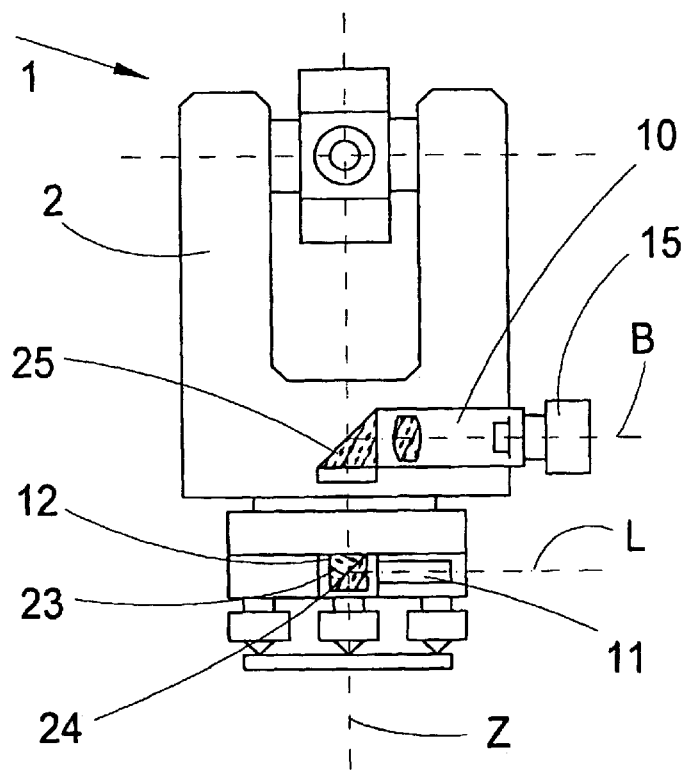
FIG. 2 shows a second embodiment example of an arrangement of this type in a partial sectional view.

FIG. 2 shows a second embodiment example of the arrangement according to the invention for the vertical orientation of a geodetic instrument over a ground point, wherein the geodetic instrument is a tachymeter 1 again in this case.

The arrangement likewise comprises an optical observation device 10 and a laser device 11 whose beams B and L, in contrast to the first embodiment example, are simultaneously coupled into the target axis Z which is to be oriented to the ground point by means of a stationary optical in-coupling element 12 which is oriented in a defined manner to the geodetic instrument or tachymeter 1.

For this purpose, the in-coupling element 12 is constructed as a splitter cube 23 with an optically selective coating 24 which reflects the laser light but passes the light in the visible range.

As can be seen from FIG. 2, the target beam B and the laser beam L are arranged orthogonal to the target axis Z, wherein the optical observation device 10 with the eyepiece 15 is arranged above the laser device 11. In order to deflect the target beam B onto the splitter cube 23, the optical observation device 10 comprises an optical deflecting element 25 which is arranged in the prolongation of the target axis Z and which, for example, can be constructed as a deflecting mirror or as a prism.

Figure 3:
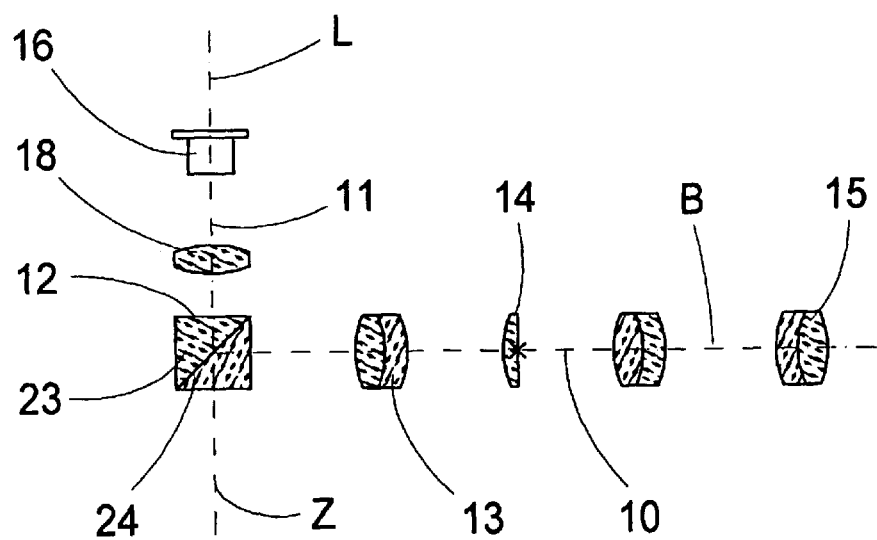
FIG. 3 is a schematic view of a third embodiment example showing only an optical observation device, a laser device and an optical in-coupling element in relation to a target beam, a laser beam and a target axis.

In an alternative embodiment form which is indicated schematically as a third embodiment example in FIG. 3, the splitter cube 23 is located in the intersection area of the target axis Z and target beam B. The laser beam L is coupled in from a direction in the continuation of the target axis Z through the splitter cube 23. The laser device can be arranged with its laser diode 16 coaxial to the target axis Z for this purpose.

However, it is also possible to orient the laser diode 16 on an axis orthogonal to the target axis Z and to deflect the laser beam L corresponding to the target beam B in FIG. 2 onto the splitter cube 23. However, in the third embodiment example, the selective coating 24 of the splitter cube 23 is constructed in such a way that the laser light passes through the coating 24 unaffected, while the light in the visible region is reflected from the target axis Z in the direction of the target beam B.

As is illustrated in the second and third embodiment examples, the optical observation device 10 and the laser device 11 can be arranged spatially with respect to one another relatively freely when using a stationary optical in-coupling element 12. In the tachymeter 1 shown in FIG. 2, for example, the optical observation device 10 is located in the support 2 of the tachymeter 1, whereas the laser device 11 is arranged in a portion of a base, not shown, which can be constructed, for example, as a stand or tribrach. However, it is also possible to arrange the optical observation device 10 in the base and the laser device 11 in the support 2 or to arrange the two component groups together inside the support 2 or inside the base.

The arrangements shown in FIG. 2 and FIG. 3 can be used as optical plummet or as laser plummet depending on the brightness conditions Further, it is possible to sight the light spot generated in the target plane by the laser device 11 via an observation device 10, so that it is possible to monitor the coincidence of the light spot with the ground point in a very accurate manner.

Moreover, in these cases, the light spot can also be used as an orientation mark, so that an orientation mark which would otherwise preferably be coupled into the target beam B or target axis Z for the optical plummet operating mode can be dispensed with in a simplified constructional variant.

The embodiment examples described above enable a precise orientation of a geodetic instrument to a ground point independent from the brightness conditions of the surroundings. In doing so, the geodetic instrument retains its compact dimensioning. In addition, the use of a stronger laser can be avoided.

While the foregoing description and drawings represent the present invention, it will be obvious to those skilled in the art that various changes may be made therein without departing from the true spirit and scope of the present invention.

REFERENCE NUMBERS 1 tachymeter
2 support
3 insert pin
4 module
5 bearing sleeve
6 axial plate
7 pivot
8 bushing
9 sleeve
10 observation device
11 laser device
12 optical in-coupling element
13 observation objective
14 field lens with crosshair
15 eyepiece
16 laser diode
17 printed circuit board
18 projection objective
19 prism
20 stop pin
21 longitudinal groove
22 access opening
23 splitter cube
24 optically selective coating
25 deflecting element
26 light passage openings
Z target axis
B target beam
L laser beam

What is claimed is:

1. An arrangement for the vertical orientation of a geodetic instrument over a ground point, comprising:

an optical observation device for visual sighting of the ground point by a target beam;

a laser device for generating a laser beam; and an optical in-coupling element by which the laser beam and the target beam can be coupled into an optical target axis impinging vertically on the ground point.

2. The arrangement according to claim 1, wherein the optical in-coupling element is switchable between a first position in which the target beam is coupled into the target axis and a second position in which the laser beam is coupled into the target axis.

3. The arrangement according to claim 2, wherein the in-coupling element is a prism which has a first reflection surface for coupling the target beam into the target axis and a second reflection surface for coupling the laser beam into the target axis.

4. The arrangement according to claim 3, wherein the observation device and the laser device are arranged together in a sleeve with the prism disposed therebetween, wherein the sleeve is movable along its longitudinal axis and is oriented in a definite manner relative to the target axis in two end positions of its adjustment path.

5. The arrangement according to claim 4, wherein the target beam and the laser beam are oriented in the direction of the longitudinal axis of the sleeve and the target axis takes on a right angle to the longitudinal axis of the sleeve.

6. The arrangement according to claim 1, wherein the in-coupling element is a mirror which is swivelable about an axis of rotation and which couples either the target beam or the laser beam into the target axis at a first adjustment angle and directs the other respective beam into the target axis at a second adjustment angle.

7. The arrangement according to claim 1, wherein the in-coupling element is an optical deflecting device which is oriented so as to be stationary with respect to the geodetic instrument and has an optically selective coating, wherein the coating either transmits daylight in the visible range which impinges at an oblique incident angle, but reflects laser light impinging at this incident angle, or reflects light in the visible range which impinges at an oblique incident angle, but transmits incident laser light.

8. The arrangement according to claim 6, wherein the target beam and the target axis are arranged orthogonal to one another.

9. The arrangement according to claim 6, wherein the laser beam and the target axis are arranged orthogonal to one another.

10. The arrangement according to claim 1, wherein a reticle mark to be oriented to the ground point is arranged in the target beam.

* * * * *